United States Patent
Lutz et al.

(10) Patent No.: US 12,109,843 B2
(45) Date of Patent: Oct. 8, 2024

(54) TREAD PROFILE OF A VEHICLE TYRE

(71) Applicant: Continental Reifen Deutschland GmbH, Hannover (DE)

(72) Inventors: André Lutz, Hannover (DE); Florian Kristen, Burgwedel (DE)

(73) Assignee: Continental Reifen Deutschland GmbH, Hannover (DE)

( * ) Notice: Subject to any disclaimer, the term of this patent is extended or adjusted under 35 U.S.C. 154(b) by 133 days.

(21) Appl. No.: 17/906,614

(22) PCT Filed: Dec. 7, 2020

(86) PCT No.: PCT/EP2020/084811
§ 371 (c)(1),
(2) Date: Sep. 16, 2022

(87) PCT Pub. No.: WO2021/185474
PCT Pub. Date: Sep. 23, 2021

(65) Prior Publication Data
US 2023/0166564 A1  Jun. 1, 2023

(30) Foreign Application Priority Data
Mar. 17, 2020 (DE) ..................... 10 2020 203 381.1

(51) Int. Cl.
*B60C 11/13* (2006.01)
*B60C 11/03* (2006.01)

(52) U.S. Cl.
CPC ...... *B60C 11/1307* (2013.01); *B60C 11/0309* (2013.01); *B60C 2011/1338* (2013.01)

(58) Field of Classification Search
CPC . B60C 11/0309; B60C 11/042; B60C 11/047; B60C 11/1307; B60C 11/1281; B60C 2011/1338
See application file for complete search history.

(56) References Cited

U.S. PATENT DOCUMENTS 2,616,041 A 10/1952 Anger et al.
2,661,041 A 12/1953 Walsh
(Continued)

FOREIGN PATENT DOCUMENTS

DE 1505020 A1 4/1969
EP 2722199 A1 4/2014
(Continued)

OTHER PUBLICATIONS

English machine translation of JP-06115318-A (Year: 1994).*
(Continued)

*Primary Examiner* — Robert C Dye (57) ABSTRACT

A rubber rib extending in the extension direction of a groove is respectively formed in profile element flanks which delimit the groove and each form a different groove wall. The rubber rib formed in one groove wall is formed in a different radial position than the rubber rib formed in the other groove wall. The two rubber ribs each extend over the entire extension length of the profile element flank and each of these two rubber ribs respectively extends along its entire extension length from that profile element flank in which it is formed into the groove in the direction of the other profile element flank up to at least the middle of the groove width in this radial position of the groove and ends there in the groove at a distance from the profile element flanks.

12 Claims, 5 Drawing Sheets (56) References Cited

U.S. PATENT DOCUMENTS

| | | | |
|---|---|---|---|
| 3,095,024 A | 6/1963 | Robertson | |
| 9,033,013 B2 | 5/2015 | Brown | |
| 10,343,461 B2 * | 7/2019 | Maehara | ............ B60C 11/0306 |
| 2009/0301622 A1 | 12/2009 | Brown | |
| 2011/0290393 A1 * | 12/2011 | Berger | ................... B60C 11/12 |
| | | | 152/209.21 |

FOREIGN PATENT DOCUMENTS

| | | | | | |
|---|---|---|---|---|---|
| EP | 2736734 B1 | * | 3/2019 | ......... | B60C 11/0306 |
| JP | 103135804 A | | 6/1991 | | |
| JP | 06115318 A | * | 4/1994 | ........... | B60C 11/042 |
| JP | 2005022580 A | * | 1/2005 | ........... | B60C 11/047 |
| JP | 2007223493 A | * | 9/2007 | ......... | B60C 11/1281 |
| JP | 2012218472 A | | 11/2012 | | |

OTHER PUBLICATIONS

English machine translation of JP-2005022580-A (Year: 2005).*
English machine translation of JP-2007223493-A (Year: 2007).*
International Search Report dated Feb. 5, 2021 of International Application PCT/EP2020/084811 on which this application is based.

* cited by examiner

Fig. 7
VII - VII

Fig. 8

VIII - VIII

Fig. 9

TREAD PROFILE OF A VEHICLE TYRE

The invention relates to a tread profile of a vehicle tire with profile elements separated from one another by grooves, wherein the profile elements separated by a groove are outwardly delimited in the radial direction by a radially outer surface forming the ground contact area and toward the groove respectively by a profile element flank forming a groove wall and wherein the grooves are inwardly delimited in the radial direction by a groove base and on both sides of the groove base respectively by a groove wall which extends in the radial direction starting from the groove base to the radially outer surface of the profile element delimited by it, wherein a rubber rib extending in the extension direction of the groove is respectively formed in the profile element flanks which delimit the groove and each form a different groove wall of the groove.

Pneumatic vehicle tires of this type are known. The tread profiles of pneumatic vehicle tires are formed with grooves delimited by profile elements. It is known to form commercial vehicle tires with circumferential grooves which are delimited by profile ribs or by profile block rows, the profile block rows being formed from profile block elements delimited by transverse grooves.

The grooves allow the take-up and drainage of water and mud when rolling on the road surface. In the case of commercial vehicle tires in particular, the grooves also allow the take-up of stones and debris and other foreign particles, which can penetrate to the groove base. There is also the possibility that such foreign particles can penetrate into the rubber material in the groove base area. It is therefore desirable, particularly when using such pneumatic vehicle tires with an increased risk of stone trapping, to avoid the penetration of stones as far as possible. In this way, damage to the groove base and possible penetration of foreign bodies into the belt area can be avoided.

For example, from U.S. Pat. No. 2,661,041 A, it is known to form cylindrical elevations in both groove walls of a groove in the same identical height position, but in alternating sequence behind one another in the direction of groove extension, which elevations each extend from one groove wall in the direction of the other, but end at a distance from the other groove wall. To a limited extent, the design can prevent stones from penetrating, but between the cylindrical elevations formed in an alternating sequence there is still sufficient open access to the groove base, which, however, also allows larger foreign bodies to penetrate. Likewise, penetration of foreign bodies between the cylindrical elevations and the opposite wall cannot be avoided.

It is known from U.S. Pat. No. 9,033,013 B2 to form ribs or rib-shaped sections in both groove walls delimiting a groove, each at the same height position. In this design, too, there is sufficient space with free passage to the groove base between the ribs or rib-shaped sections positioned at the same height and also in the sections outside of these ribs or rib-shaped sections, so that foreign bodies can easily penetrate here as well. Due to the design of the rib-shaped sections in both groove walls in the same extension section, use of such a design is also only possible with very wide grooves. An effective design for narrow grooves can hardly be implemented with the known designs.

It is known from DE1505020A1 to alternately form extension sections of the circumferential grooves with rib-shaped sections arranged one above the other in the groove walls in the radial direction of the tire in circumferential grooves which delimit circumferential ribs. In one extension section of the groove, the rib-shaped section arranged above is formed in one groove wall and the rib-shaped section arranged below is formed in the other groove wall, and in a subsequent extension section exactly opposite the one arranged above in the other wall and the one arranged below in one groove wall. This alternating sequence of rib-shaped sections arranged one above the other in the extension direction of the groove also only has the effect that two rib-shaped sections could show an effect in individual circumferential extension sections of the tire. In the transition sections of the rib sections arranged one behind the other in sequence, however, there are sections with an open passage up to the groove base, which allow stones and other foreign particles to easily penetrate and get through to the groove base. In addition, such stones and foreign objects that have penetrated into the region of the groove base are then prevented from leaving the tire profile by the adjacent sections, so that in such designs the foreign bodies are well and truly caught in the lower region of the groove base and the groove base can be damaged as a result.

The invention is therefore based on the object of enabling a tread profile of a vehicle tire—in particular for use in commercial vehicles or van vehicles—in which adjacent raised profile elements separated from one another by grooves are formed, which make it possible to sufficiently take up and drain off water and over the entire profile element extension to allow better protection against the ingress of stones to the groove base.

The object is achieved according to the invention by the design of a tread profile of a vehicle tire with profile elements separated from one another by grooves, wherein the profile elements separated by a groove are outwardly delimited in the radial direction by a radially outer surface forming the ground contact area and toward the groove respectively by a profile element flank forming a groove wall and wherein the grooves are inwardly delimited in the radial direction by a groove base and on both sides of the groove base respectively by a groove wall which extends in the radial direction starting from the groove base to the radially outer surface of the profile element delimited by it, wherein a rubber rib extending in the extension direction of the groove is respectively formed in the profile element flanks which delimit the groove and each form a different groove wall of the groove, according to the features of claim 1, in which the rubber rib formed in one groove wall is formed in a different radial position of the vehicle tire than the rubber rib formed in the other groove wall, wherein the two rubber ribs each extend over the entire extension length of the profile element flank and wherein each of these two rubber ribs respectively extends along its entire extension length from that profile element flank in which it is formed into the groove in the direction of the other profile element flank up to at least the middle of the groove width in this radial position of the groove and ends there in the groove at a distance from the profile element flanks.

This design makes it possible for the two rubber ribs formed in the groove walls to be positioned one above the other along the entire extent of the profile element delimiting the groove and, in their extension direction, to extend to the respective opposite profile element delimiting the groove into a position such that an overlap with the respective other rubber rib occurs. In this way, a kind of labyrinth seal is created within the groove along the entire extent of the profile element, which makes it possible to largely prevent the ingress of stones or other sharp foreign bodies and still maintain the groove character for taking up water and draining water. In this way, a high level of security against the ingress of foreign bodies while at the same time maintaining the take-up and drainage of water can thus be implemented with simple means, even with very narrow grooves.

In this way, even particularly vulnerable commercial vehicle tires and van tires can be easily and reliably protected against the ingress of stones.

The design of a tread profile according to the features of claim 2 is particularly advantageous, with the groove being formed with a groove depth T measured in the radial direction, starting from the groove base to the radially outer surface of the adjacent profile elements, and the two rubber ribs being formed within a radial extension range of the extension height $H_1=T/2$ measured radially outward starting from the groove base. In this way, it can be ensured in a simple manner that the groove can close in the radial direction outside of the rubber ribs to such an extent that the penetration of stones is minimized.

The design of a tread profile according to the features of claim 3 is particularly advantageous, with the two rubber ribs each being formed in a radial position outside of a height $H_2=3$ mm measured radially outward starting from the groove base. In this way, it can be ensured in a simple manner that stress peaks occurring during the deformation of the tire by the rubber ribs occur at a sufficiently large distance from the groove base. This can also minimize the possibility of groove cracks developing.

The design of a tread profile according to the features of claim 4 is particularly advantageous for simple shaping during the tire building process, wherein the two rubber ribs are each formed with a cross-sectional plane formed perpendicular to the extension direction of the groove with an—in particular semicircular—rounded sectional contour at their extension end pointing to the other profile element flank.

Particularly advantageous for achieving an optimal sealing effect is the design of a tread profile according to the features of claim 5, wherein the groove is formed with a radial extension section of the extension height $H_3$ measured in the radial direction R, in which the two groove walls formed by the profile element flanks extend parallel in the cross-sectional planes formed perpendicular to the extension direction of the grooves, this extension section being the narrowest radial extension section of the groove, in which the groove width B is constant with $2 \text{ mm} \leq B \leq 4$ mm, and wherein the two rubber ribs are formed inside this radial extension section.

Particularly advantageous is the formation of a tread profile according to the features of claim 6, wherein the groove is formed with a radially outer extension section, which extends radially outward to the radially outer surface, in which the groove along its radial extent outward with increasing Groove width B is formed. As a result, due to the larger opening in the radially outer section, the advantages for good wet braking properties and the good abrasion performance can be implemented in an optimally combined manner due to a smaller void in the lower, narrow extension section. The rubber ribs in the narrow extension section overcompensate for the disadvantages for stone catching caused by the large groove opening in the radially outer extension section of the groove.

The design of a tread profile according to the features of claim 7 is particularly advantageous, with the groove being a circumferential groove. As a result, precisely the grooves of the vehicle tire that are particularly susceptible to stone trapping are equipped with the sealing effect and the vehicle tire is therefore particularly protected overall.

The design of a tread profile according to the features of claim 8 is particularly advantageous, with the profile elements delimiting the groove each being part of a profile strip, with in particular the profile elements of at least one profile strip being profile block elements of a profile block row.

Particularly advantageous is the design of a tread profile according to the features of claim 9, wherein the two rubber ribs are formed at a distance $d_1$ from each other with $1 \text{ mm} \leq d_1 \leq 3$ mm. With this design, the distance is large enough to avoid contact between the rubber ribs and damage or abrasion caused thereby, and small enough to ensure a good sealing effect of the labyrinth seal and to prevent stones from penetrating.

Particularly advantageous is the design of a tread profile according to the features of claim 10, wherein each of the two rubber ribs is respectively formed with its extension end pointing away from its profile element flank at a distance $d_2$ from the other profile element flank with $1 \text{ mm} \leq d_2 \leq 2$ mm. With this design, a sufficiently small distance between the rubber ribs for reliable closing of the labyrinth seal can be ensured in a simple manner without impairing the dimensional stability and demolding ability.

The design of a tread profile according to the features of claim 11 is particularly advantageous, wherein the rubber rib is formed with an extension width h measured in the radial direction R of the tire with $1.5 \text{ mm} \leq h \leq 3$ mm. The extension width h is sufficiently large to provide sufficient resistance to undesired abrasion by stones penetrating up to the rubber rib without filling the groove so much with rubber material that the wet braking properties are undesirably impaired.

Particularly advantageous is the design of a tread profile according to the features of claim 12, wherein the pair of rubber ribs is formed, at a constant distance $d_1$ from one another along the extension of the groove, with—in particular wavy—changed profile of the radial position. It can thus be prevented that wet properties are abruptly changed when the vehicle tire wears until a rubber rib is reached.

The invention is explained in more detail below with reference to the exemplary embodiments illustrated in FIGS. 1 to 9. In the figures.

Figure 1:
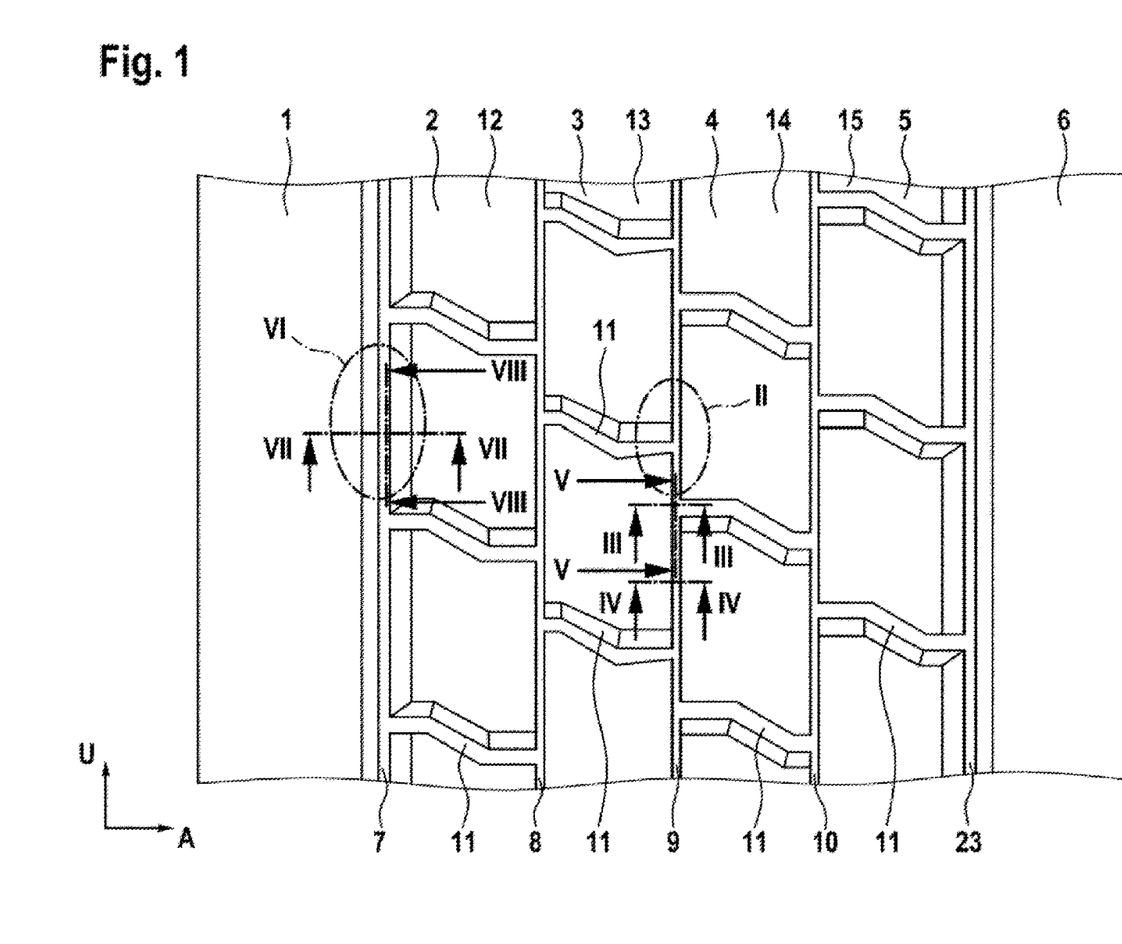
FIG. 1 shows a circumferential section of a tread profile of a vehicle tire in plan view.

FIGS. 1 to 8 show a tread profile of the pneumatic vehicle tire of a commercial vehicle. The tread profile is—as shown in FIG. 1—formed with the circumferential ribs 1, 6 arranged next to one another in the axial direction A of the pneumatic vehicle tire and each spaced apart from one another by circumferential grooves 7, 8, 9, 10, 23 and extending over the entire circumference of the pneumatic vehicle tire, and profile block rows 2, 3, 4, 5. The two circumferential ribs 1 and 6 are formed in the two tire shoulders and thus form the profile strips of the tire shoulders. In the axial direction A
between the two circumferential ribs 1 and 6, the profile block rows 2, 3, 4 and 5 are formed, which form the central profile strips.

As shown in FIG. 1, the profile block row 2 is separated from the circumferential rib 1 in the axial direction A by the circumferential groove 7. The profile block row 2 and the profile block row 3 are separated from one another in the axial direction A by the circumferential groove 8. The profile block row 3 and the profile block row 4 are separated from one another in the axial direction A by the circumferential groove 9. The profile block row 4 and the profile block row 5 are separated from one another in the axial direction A by the circumferential groove 10. The profile block row 5 and the circumferential rib 6 are separated from one another in the axial direction A by the circumferential groove 23.

The profile block rows 2, 3, 4 and 5 are each formed in a known manner from profile block elements which are arranged one behind the other over the circumference of the pneumatic vehicle tire and are each separated from one another by transverse grooves 11.

The profile block row 2 is formed from profile block elements 12 which are arranged one behind the other in the circumferential direction U over the circumference of the pneumatic vehicle tire and are separated from one another by transverse grooves 11. The profile block row 3 is formed from profile block elements 13 which are arranged one behind the other in the circumferential direction U over the circumference of the pneumatic vehicle tire and are separated from one another by transverse grooves 11. The profile block row 4 is formed from profile block elements 14 which are arranged one behind the other in the circumferential direction U over the circumference of the pneumatic vehicle tire and are each separated from one another by transverse grooves 11. The profile block row 5 is formed from profile block elements 15 which are arranged one behind the other in the circumferential direction U over the circumference of the pneumatic vehicle tire and are separated from one another by transverse grooves 11.

The transverse grooves 11 of the profile block row 2 extend from the circumferential groove 7 through the profile block row 2 to the circumferential groove 8. The transverse grooves 11 of the profile block row 3 extend from the circumferential groove 8 through the profile block row 3 to the circumferential groove 9. The transverse grooves 11 of the profile block row 4 extend from the circumferential groove 9 through the profile block row 4 to the circumferential groove 10. The transverse grooves 11 of the profile block row 5 extend from the circumferential groove 10 through the profile block row 5 to the circumferential groove 23.

Figure 3:
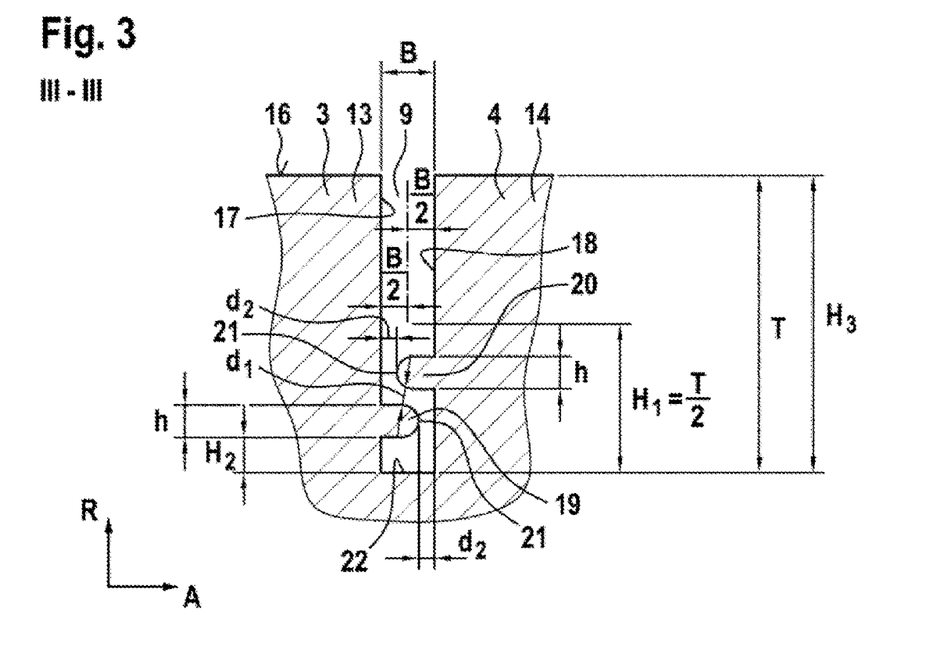
FIG. 3 shows the tread profile of FIG. 1 in a sectional view according to section III-III of FIG. 1.
Figure 4:
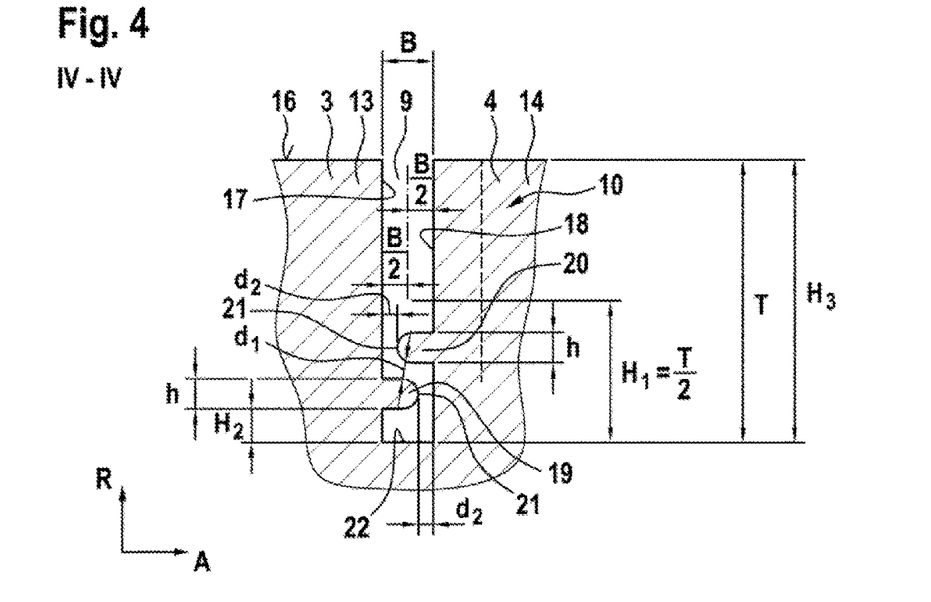
FIG. 4 shows the tread profile of FIG. 1 in a sectional view according to section IV-IV of FIG. 1.
Figure 5:
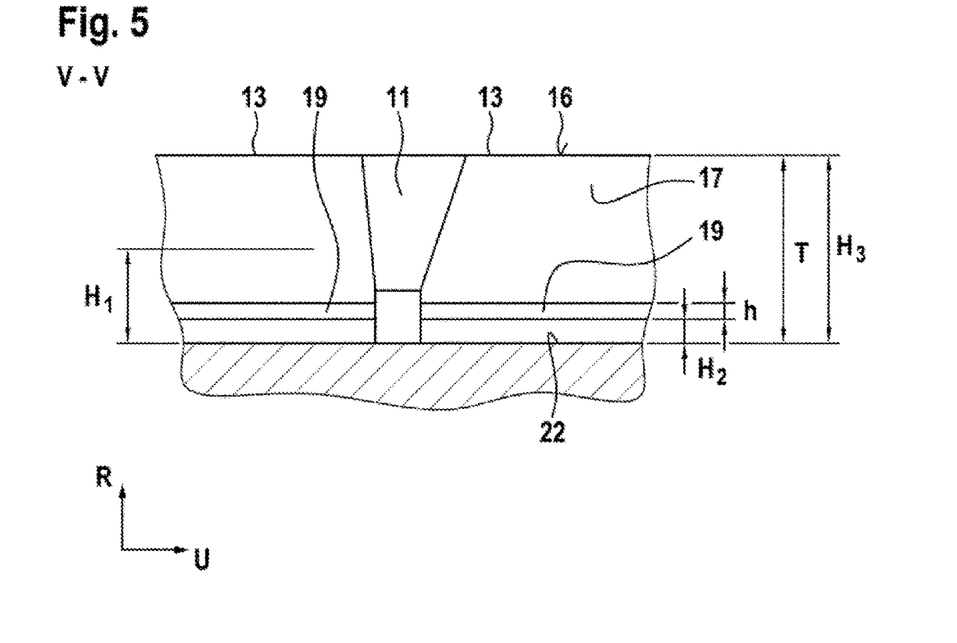
FIG. 5 shows the tread profile of FIG. 1 in a sectional view according to section V-V of FIG. 1.

The circumferential ribs 1 and 6 and the profile block elements 12, 13, 14 and 15 of the profile block rows 2, 3, 4 and 5 are—as shown by the example of the profile block elements 13 and 14 in FIG. 3 and FIG. 4—are outwardly delimited in the radial direction R of the pneumatic vehicle tire by a radially outer surface 16 forming the road contact surface.

The transverse grooves 11 and the circumferential grooves 7, 8, 9, 10 and 23 are inwardly delimited in a known manner in the radial direction R by a respective groove base 22 and on both sides of the groove base 22 respectively by a groove wall which extends from the groove base 22 to the radially outer surface 16 outward in the radial direction R and thereby forms the respective flank of the profile element delimited by the transverse or circumferential groove, which flank points toward the transverse or circumferential groove.

Figure 2:
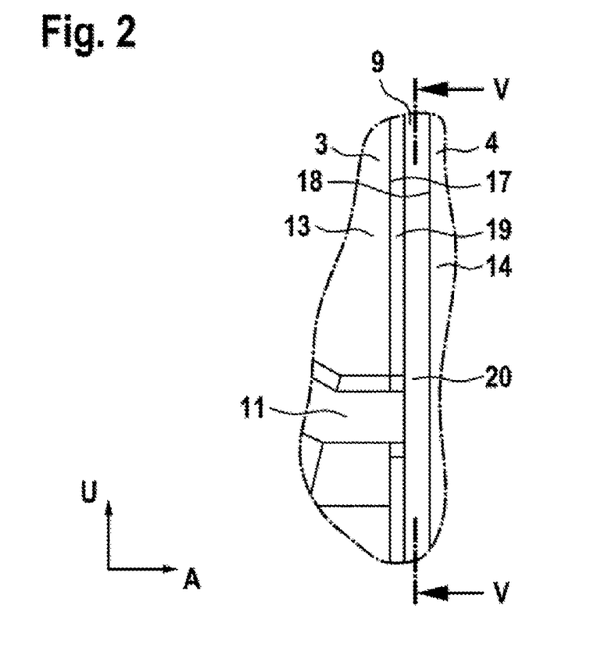
FIG. 2 shows an enlarged detail view II of the plan view of FIG. 1.

As shown in FIGS. 2 and 3 using the example of the circumferential groove 9, the circumferential grooves 6, 7, 8, 9, 10 are delimited on both sides of the groove base 22 with groove walls 17 and 18 which extend from the groove base 22 in the radial direction R of the pneumatic vehicle tire outwardly to the radially outer surface 16 and end there. Using the example of circumferential groove 9, the groove wall 17 forms the respective flanks of profile block elements 13 of the profile block row 3 delimited by circumferential groove 9, and the groove wall 18 forms the flanks of the profile block elements 14 of the profile block row 4 delimited on the other side by the circumferential groove 9.

The circumferential groove 9 is formed with a groove depth T, which corresponds to the profile depth, measured starting from the radially outer surface 16 of the profile block elements 13 and 14 delimited by the circumferential groove 9 in the radial direction R inward to the deepest point of the groove base 22.

In FIGS. 2 to 5, the formation of a circumferential groove according to the invention is shown and explained using the example of a circumferential groove 9 which separates a profile block row 3 from a profile block row 4.

The groove walls 17 and 18 are formed in the cross-sectional planes, which are formed perpendicularly to the main extension direction of the circumferential groove 9, and, in the case of circumferential grooves, are those sectional planes which contain the tire axis, along a radial extension section of the extension height $H_3$ measured in the radial direction $R_3$ with sectional contours running parallel to one another. The groove walls 17 and 18 are formed in this extension section of the extension height $H_3$ at a distance B from one another, which forms the groove width in this extension section. The extension section of span height $H_3$ is formed with a width B, which is between 2 mm≤B≤4 mm.

In the illustrated exemplary embodiment of FIGS. 3 and 4, $H_3=T$ is chosen.

As shown in FIGS. 3 and 4, within a radial extension section of height $H_1=T/2$, which is measured radially outward starting from the groove base 22, a rubber rib 19 extending over the entire circumference of the pneumatic vehicle tire is formed in the groove wall 17, which delimits the profile block element row 13, which rubber rib rises into the circumferential groove 9 starting from the groove wall 17 in the direction of the groove wall 18 and extends with its elevation in the axial direction A of the pneumatic vehicle tire to more than half the groove width and thus over a position at a distance B/2 from the groove wall 17 and ends there with its extension end 21 pointing to the groove wall 18 at a distance $d_2$ from the groove wall 18. In an analogous manner, within this radial extension section of height $H_1=T/2$, which is measured radially outward starting from the groove base 22, a rubber rib 20 extending over the entire circumference of the pneumatic vehicle tire is formed in the groove wall 18, which delimits the profile block element row 14, which rubber rib rises into the circumferential groove 9 starting from the groove wall 18 in the direction of the groove wall 17 and extends with its elevation in the axial direction A of the pneumatic vehicle tire to more than half the groove width and thus over a position at a distance B/2 from the groove wall 18 and ends there with its extension end 21 pointing to the groove wall 17 at a distance $d_2$ from the groove wall 17. The rubber ribs 19 and 20 extend along the entire extension of the circumferential groove 9 with their main extension direction in the circumferential direction U of the vehicle tire. The rubber rib 19 extends respectively along the entire extension of the profile block element flank, formed by the groove wall 17, of a profile block element 13. The rubber rib 20 extends respectively along the entire extension of the profile block element flank, formed by the groove wall 18, of a profile block element 14. The distance $d_2$ is formed with $d_2 < B/2$.

Both rubber ribs 19 and 20 are each formed with a rib width h measured in the radial direction R of the pneumatic vehicle tire along their entire extension in the circumferential direction U of the pneumatic vehicle tire. The rib width h of the rubber rib 19 is formed in the groove wall 17 at its maximum value. The rib width h of the rubber rib 20 is formed in the groove wall 18 at its maximum value.

The two rubber ribs 19 and 20 formed in the circumferential groove 9 are positioned offset from one another in the radial direction R of the pneumatic vehicle tire. As shown in FIGS. 3 and 4, the rubber rib 20 is thus positioned in the radial direction R of the pneumatic vehicle tire outside of the position of the rubber rib 19, with the two rubber ribs 19 and 20 being positioned offset from one another in such a way that, despite the axial overlapping of their extension ends in the region of the center of the groove width, they are positioned at a distance $d_1$ from one another. As shown in FIGS. 3 and 4, the rubber rib 19 positioned closer to the groove base 22 is positioned at a distance $H_2$ from the groove base 22 measured in the radial direction R of the pneumatic vehicle tire, with the distance $H_2$ being measured in the groove wall 17.

The extension width h of the rubber ribs 19, 20 is chosen with 1.5 mm ≤ h ≤ 3 mm. The distance $d_1$ between the adjacent rubber ribs 19, 20 is chosen with 1 mm ≤ $d_1$ ≤ 3 mm. The distance $d_2$ between the rubber rib 19 or 20 and the respectively opposite groove wall 18 or 17 is formed with 1 mm ≤ $d_2$ > 2 mm.

The extension height $H_1$ is formed with $H_1 \leq T/2$. The extension height $H_2$ is formed with $H_2 \leq 3$ mm. In the illustrated exemplary embodiment, $H_2 = 3$ mm is chosen.

Figure 6:
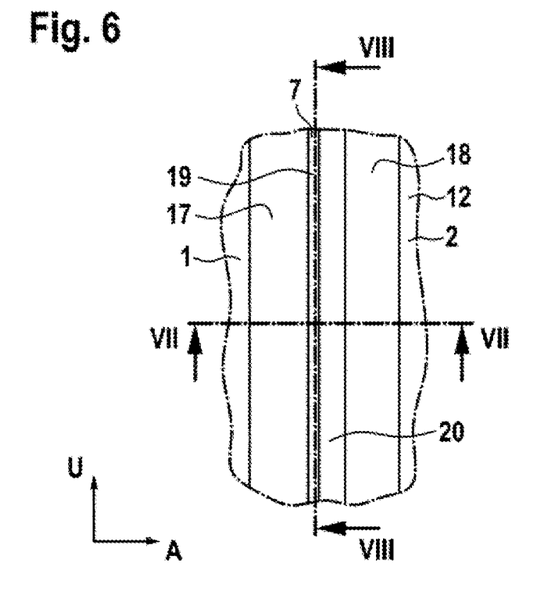
FIG. 6 shows an enlarged detail view of detail VI-VI of FIG. 1.
Figure 7:
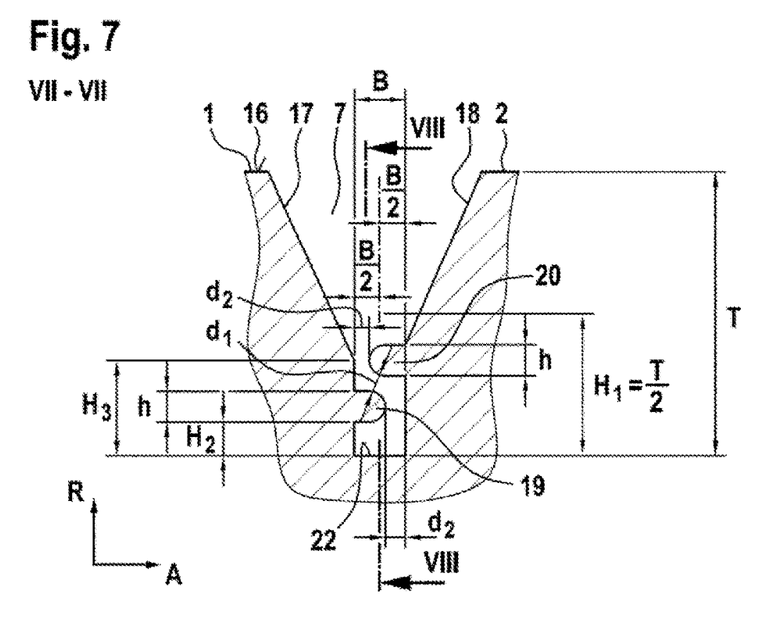
FIG. 7 shows the tread profile of FIG. 1 in a sectional view according to section VII-VII of FIG. 1.
Figure 8:
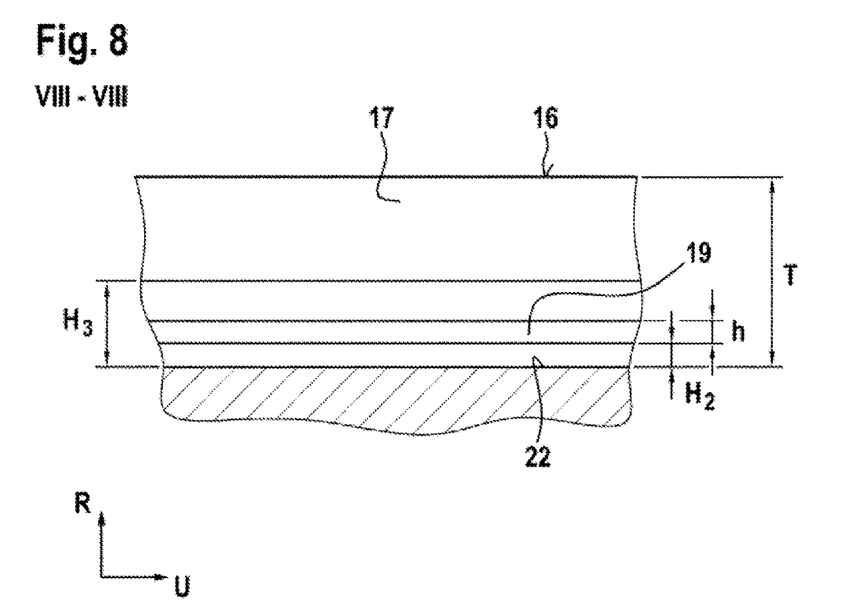
FIG. 8 shows the tread profile of FIG. 1 in a sectional view according to section VIII-VIII of FIG. 1.

In FIGS. 6 to 8, the formation of a circumferential groove according to the invention is shown and explained using the example of a circumferential groove 7 which separates a circumferential rib 1 formed in one tire shoulder from the profile block row 2. As can be seen from FIGS. 6 to 8, the circumferential groove 7 is also formed with a groove depth T in this exemplary embodiment. Likewise, with this design, within an extension section of the extension height $H_3$ measured in the radial direction R starting from the groove base 22, the two groove walls 17 and 18 are formed in the sectional planes perpendicular to the main extension direction of the circumferential groove 7 with a sectional contour profile of the groove walls 17 and 18 oriented parallel to one another at a constant distance and thus with a substantially constant groove width B. In the illustrated exemplary embodiment, the extension height $H_3$ is formed with $H_3 < T$. Radially outside the extension section of the extension height $H_3$, the circumferential groove 7 is formed with a continuously increasing groove width B along the radial extension of the circumferential groove 7 up to the radially outer surface 16 of the adjacent circumferential rib 1 and the adjacent profile block row 2.

As can be seen in FIGS. 7 and 8, within the extension section of the extension height $H_1$ and within the extension section of the extension height $H_3$, in an analogous manner, a rubber rib 19 is formed in the groove wall 17 and a rubber rib 20 is formed in the groove wall 18, which ribs—as already indicated in connection with the other exemplary embodiments—are formed with the rib width h, at a distance $d_1$ from each other and at a distance $d_2$ from the respective opposite groove wall. The rubber rib 19 arranged closer to the groove base 22 is arranged at a distance $H_2$ from the groove base 22 measured in the radial direction R of the pneumatic vehicle tire. As can be seen in FIG. 7, the radially outer rubber rib 20 is formed with at least half of its rib width h measured in the radial direction R still within the extension section of the extension height $H_3$.

In the exemplary embodiments illustrated above, the rubber ribs 19 and 20 are each formed along their entire extension over the circumference of the pneumatic vehicle tire in a constant radial position of the tire with a rib width h formed in the radial direction, at their distance $d_1$ from each other and at a distance $d_2$ from the respective opposite groove wall.

Figure 9:
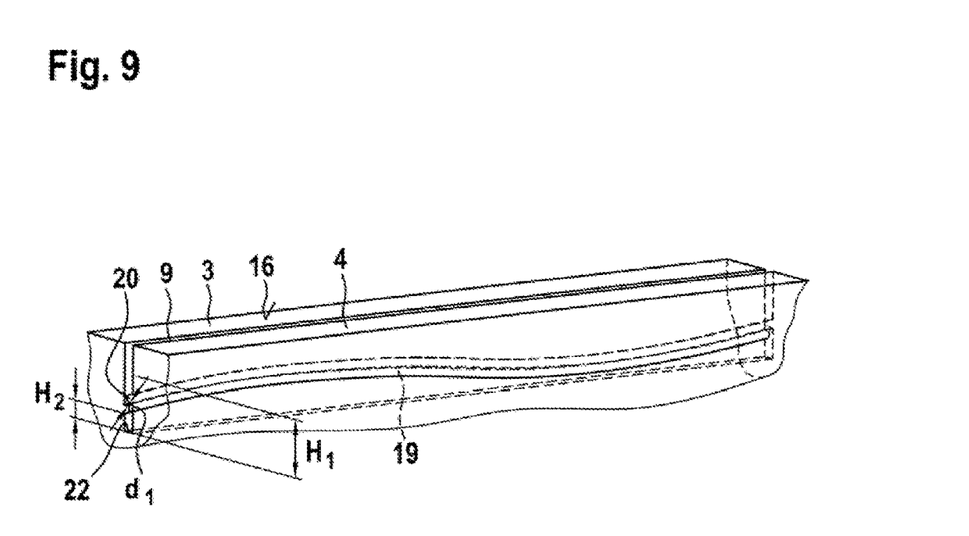
FIG. 9 is an enlarged perspective representation of the section of the tread profile of FIG. 1 with an alternative design of the rubber ribs of a circumferential groove.

An alternative design of the rubber ribs 19 and 20 is shown in FIG. 9 using the example of a circumferential groove 9. In this design, too, the rubber ribs 19 and 20 are formed along their entire extension direction over the circumference of the pneumatic vehicle tire at a constant distance $d_1$ from each other, with a constant rib width h, measured in the radial direction R, in the groove wall, at a constant distance $d_2$ from the opposite groove wall, at a minimum distance $H_2$ from the groove base 22 and within the extension section of the extension height $H_1$ and within the extension section of the extension height $H_3$. However, with this design, the radial position of the rubber ribs 20 and 19 changes along their extension over the entire circumference of the pneumatic vehicle tire. In the exemplary embodiment shown, as can be seen in FIG. 9, this pair of rubber ribs 19 and 20 arranged one above the other is formed with a profile of their radial positioning that runs in a wavy shape along the extension of the vehicle tire.

LIST OF REFERENCE SIGNS

Part of the Description

1 Circumferential rib
2 Block row
3 Block row
4 Block row
5 Block row
6 Circumferential rib
7 Circumferential groove
8 Circumferential groove
9 Circumferential groove
10 Circumferential groove
11 Transverse groove
12 Profile block element
13 Profile block element
14 Profile block element
15 Profile block element
16 Radially outer surface
17 Groove wall
18 Groove wall
19 Rib
20 Rib
21 Extension end
22 Groove base

The invention claimed is:
1. A tread profile of a vehicle tire comprising:
a plurality of profile elements separated from one another by a plurality of grooves;
the profile elements are outwardly delimited in a radial direction by a radially outer surface to form a ground contact area and by a profile element flank toward a groove of the plurality of grooves to form a groove wall;

the plurality of grooves are inwardly delimited in the radial direction by a groove base and a groove wall on both sides of the groove base respectively, the groove wall extends in the radial direction starting from the groove base to the radially outer surface of the profile element;

a plurality of rubber ribs extend in an extension direction of the plurality of grooves and are formed in the profile element flanks that delimit the groove and each form a different groove wall of the groove;

a first rubber rib of the plurality of rubber ribs is formed in one groove wall and is formed in a different radial position of the vehicle tire than a second rubber rib of the plurality of rubber ribs formed in a second groove wall;

the first rubber rib and the second rubber rib extend over an entire extension length of the profile element flank and each respectively extend along its entire extension length from that profile element flank in which it is formed into the groove in the direction of the other profile element flank up to at least the middle of the groove width in this radial position of the groove and ends there in the groove so that it is spaced from the opposite profile element flank by a distance $d_2$;

the grooves are formed with a groove depth T measured in the radial direction, starting from the groove base to the radially outer surface of the adjacent profile elements, the first and second rubber ribs are formed in a lower half of the groove as measured by being radially below a half-way extension height $H_1=T/2$ which is measured radially outward starting from the groove base, wherein all portions of both the first and second rubber ribs are contained within the lower half of the groove as measured by being radially below the half-way extension height $H_1$, and the groove has no rubber rib with any portion that extends into an upper half of the groove as measured by being radially above the half-way extension height $H_1$.

2. The tread profile of claim 1, the first and second rubber ribs are each formed in a radial position above the groove base at a height H2=3 mm measured radially outward starting from the groove base.

3. The tread profile of claim 1, the first and second rubber ribs are each formed at their extension end pointing to the other profile element flank with a cross-sectional plane formed perpendicular to the extension direction of the groove with a semicircular-rounded sectional contour.

4. The tread profile of claim 1, the two groove walls formed by the profile element flanks extend parallel in the cross-sectional planes formed perpendicular to the extension direction of the grooves, this extension section is the narrowest radial extension section of the groove in which the groove width B is made constant with 2 mm≤B≤4 mm, and wherein the first and second rubber ribs are formed inside this radial extension section.

5. The tread profile of claim 4, the grooves are formed with a radially outer extension section which extends radially outward to the radially outer surface in which the groove is formed along its radially outward extension with increasing groove width B.

6. The tread profile of claim 1, the plurality of grooves are circumferential grooves.

7. The tread profile of claim 1, the profile elements delimiting the grooves are each part of a profile strip, wherein in particular the profile elements of at least one profile strip are profile block elements of a profile block row.

8. The tread of claim 1, the first and second rubber ribs are formed at a distance d1 from each other with 1 mm≤$d_1$≤3 mm.

9. The tread profile of claim 1, each of the first and second rubber ribs is formed with its extension end (21) pointing away from its profile element flank at a distance $d_2$ from the opposite profile element flank with 1 mm≤$d_2$≤2 mm.

10. The tread profile of claim 1, each of the first and second rubber ribs is formed with an extension width h measured in the radial direction of the tire with 1.5 mm≤h≤3 mm.

11. The tread profile of claim 1, the first and second rubber ribs are formed, at a constant distance $d_1$ from one another along the extension of the groove, with a wavy-changed profile of the radial position.

12. The tread profile of claim 1, the first rubber rib having a first radial thickness and being formed at a first radial height, the second rubber rib having the same radial thickness of the first rubber rib and being formed at a second radial height above the first radial height, wherein the first and second rubber ribs overlap with each other as they extend across the groove.

* * * * *